(12) United States Patent
Iino et al.

(10) Patent No.: US 6,211,603 B1
(45) Date of Patent: *Apr. 3, 2001

(54) ULTRASONIC MOTOR AND ELECTRONIC APPARATUS WITH ULTRASONIC MOTOR

(75) Inventors: Akihiro Iino; Masao Kasuga; Makoto Suzuki, all of Chiba (JP)

(73) Assignee: Seiko Instruments Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/082,507

(22) Filed: May 21, 1998

(30) Foreign Application Priority Data

May 23, 1997 (JP) .................................. 9-134180

(51) Int. Cl.⁷ .................................................. H02N 2/04
(52) U.S. Cl. .............................. 310/323.02; 310/323.17
(58) Field of Search .............................. 310/323, 328, 310/323.01, 323.02, 323.17, 323.18, 309.09

(56) References Cited

U.S. PATENT DOCUMENTS

| | | | |
|---|---|---|---|
| 3,246,608 | * | 4/1966 | Cooper .................................. 310/328 |
| 4,019,073 | * | 4/1977 | Vishnevsky et al. ................ 310/328 |
| 4,453,103 | * | 6/1984 | Vishnevsky et al. ................ 310/323 |
| 4,613,782 | * | 9/1986 | Mori et al. ........................... 310/323 |
| 4,736,131 | * | 4/1988 | Fujimoto .............................. 310/328 |
| 4,894,579 | * | 1/1990 | Higuchi et al. ...................... 310/328 |
| 4,959,580 | * | 9/1990 | Vishnevsky et al. ................ 310/323 |
| 5,036,245 | * | 7/1991 | Ohnishi et al. ...................... 310/323 |
| 5,039,899 | * | 8/1991 | Yamaguchi .......................... 310/323 |
| 5,134,334 | * | 7/1992 | Onishi et al. ........................ 310/323 |
| 5,191,688 | * | 3/1993 | Takizawa et al. ................... 310/323 |
| 5,216,313 | * | 6/1993 | Ohnishi et al. ...................... 310/323 |
| 5,416,375 | * | 5/1995 | Funakubo et al. ................... 310/323 |
| 5,585,685 | * | 12/1996 | Meano et al. ........................ 310/323 |
| 5,821,670 | * | 10/1998 | Tobe et al. ........................... 310/328 |

FOREIGN PATENT DOCUMENTS

| | | | |
|---|---|---|---|
| 4440679 | 5/1995 | (DE) | ................. H02N/2/10 |
| 2-94484 | 7/1990 | (JP) | ................. H02N/2/00 |
| 7107758 | 4/1995 | (JP) | ................. H02N/2/00 |
| 8140378 | 5/1996 | (JP) | ................. H02N/2/00 |

OTHER PUBLICATIONS

Patent Abstracts of Japan, vol. 1995, No. 01, Feb. 28, 1995, Publication No. 06284752, published Oct. 7, 1994 by EPO.
Patent Abstracts of Japan, vol. 1996, No. 08, Aug. 30, 1996, Publication No. 08098567, published Apr. 12, 1996 by EPO.

* cited by examiner

Primary Examiner—Thomas M. Dougherty
(74) Attorney, Agent, or Firm—Adams & Wilks (57) ABSTRACT

An ultrasonic motor has a vibrating member vibrationally driven for undergoing periodic vibration by the application of a high-frequency voltage. A moving body is frictionally driven by the periodic vibration of the vibrating member. A node supporting/pressurizing member supports a vibration node of the vibrating member and presses the vibrating member on the moving body.

23 Claims, 9 Drawing Sheets

ULTRASONIC MOTOR AND ELECTRONIC APPARATUS WITH ULTRASONIC MOTOR

BACKGROUND OF THE INVENTION

The present invention relates to an ultrasonic motor used for driving printers, paper feeders, machine tools, camera zoom mechanisms, and the like and, more particularly, to an ultrasonic motor of a type such that a rectangular periodically vibrating member is supported and pressurized.

In recent years, an ultrasonic motor has been known in which a driving signal of a predetermined frequency is generated by a variable oscillator, and the driving signal is applied to a piezoelectric element via a power amplifier, by which traveling waves are generated on a vibrating body connected to the piezoelectric element to move a moving body touching the vibrating body with a predetermined pressure (for example, see Japanese Patent Publication No. Sho 62-92781).

In particular, an ultrasonic drive unit using elongation vibration and bending vibration of a rectangular piezoelectric vibrating plate (dual-mode vibrator), which is capable of effecting linear movement, rotational movement, etc. of a moving body by combined displacement of vibration mode, is expected to be used for various applications.

Figure 13:
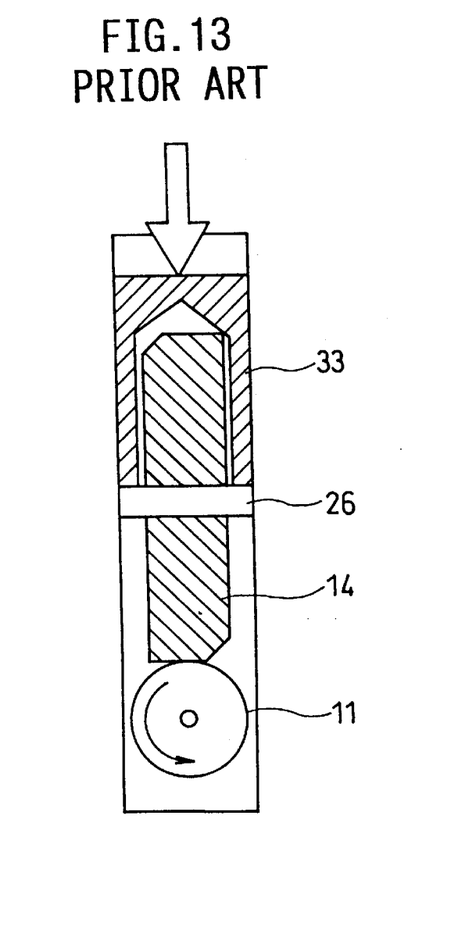
FIG. 13 is an explanatory view showing a configuration of an ultrasonic drive unit relating to the prior art.

FIG. 13 shows an ultrasonic motor of a type using a rectangular vibrator.

This motor is made up of a piezoelectric vibrating body 14 vibrated by the application of a high-frequency voltage, a moving body 11 pressed on the vibrating body 14, a support member 26 for supporting the vibration node of the vibrating body 14, and a pressurizing member 33, which is pressed on both ends of the support member 26, for providing a pressurizing force to press the moving body 11 on the vibrating body 14 (see Jpn. J. Appl. Phys. Vol. 31 (1992) Pt. 1, No. 9BP3079).

With this unit, the moving body 11 is rotated by the combination of elongation vibration and bending vibration of the vibrating body 14.

Figure 14:
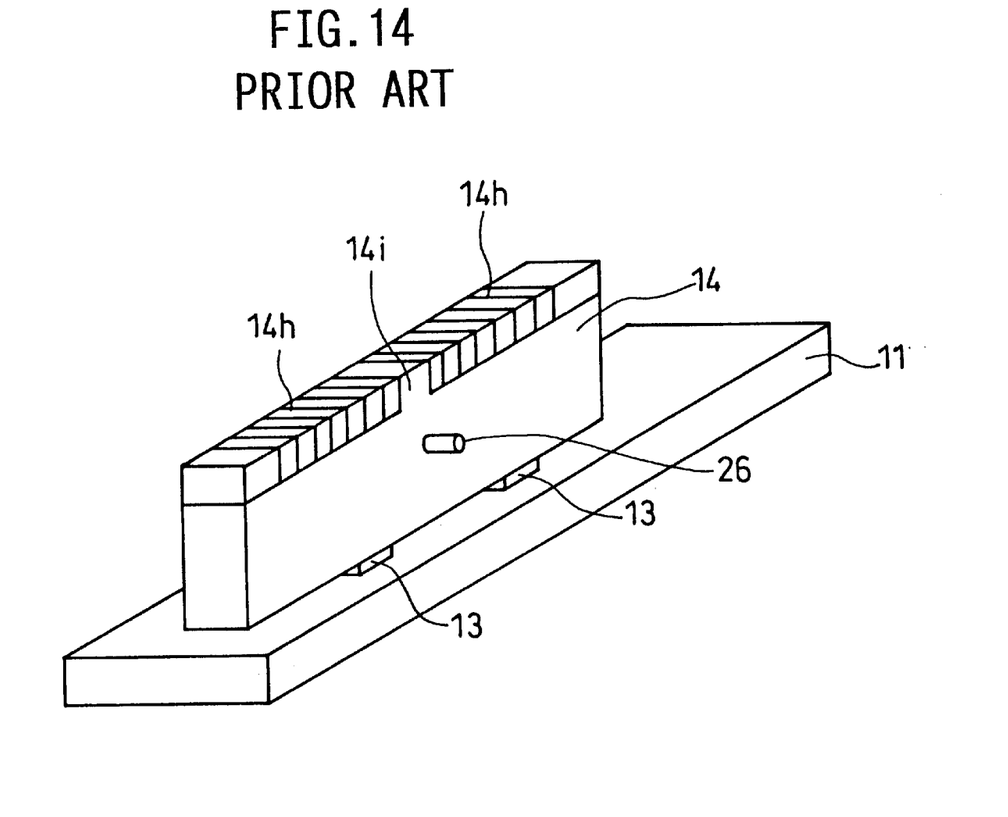
FIG. 14 is an explanatory view showing a configuration of an ultrasonic drive unit relating to the prior art.

FIG. 14 also shows an ultrasonic motor of a type using a rectangular vibrator.

This motor is made up of a vibrating body 14 consisting of multi-layer piezoelectric elements 14*h* and a vibrating portion 14*i* connected to the piezoelectric elements 14*h*, a cylindrical support member 26 locked to the vibration node of the vibrating body 14, protrusions 13 fixed on the lower side of the vibrating body 14, and a moving body 11 in contact with the protrusions 13 (see Jpn. J. Appl. Phys. Vol. 34 (1995) pp2756–2759).

With this unit, the moving body 11 is moved linearly in a fixed direction by elliptical vibrations of the protrusions 13 produced by the combination of elongation vibration and bending vibration of the vibrating body 14.

However, according to the aforementioned ultrasonic motor, because the pressurizing member 33 is needed in addition to the support member 26, there exists technical problems in that the configuration of the unit is complicated, the whole of the unit is large in size, and loss of vibration is liable to occur for the small vibration body 14.

Moreover, the aforesaid support member 26 is usually locked to the piezoelectric vibrating body 14 with a screw or pinning construction, so that the structural strength is not so high. Therefore, there arises a technical problem in that the pressurizing force provided to the support member 26 cannot be increased.

Further, the piezoelectric vibrating body 14 has a technical problem in that the moving direction of the moving body 11 is changed with respect to the target direction by a shift during assembly, nonuniformity of contact surface between the vibrating body 14 and the moving body 11, and the like.

Thereupon, the present invention was made to solve the above-mentioned technical problems, and accordingly an object thereof is to provide an ultrasonic motor in which the configuration of the unit is simplified and made compact, the support structure for the piezoelectric vibrating body is strengthened, and the change in moving direction of the moving body is prevented.

SUMMARY OF THE INVENTION

It is an object of the present invention to provide an ultrasonic motor in which the configuration of the unit is simplified and made compact, since the periodically vibrating member is supported and pressurized by the node supporting/pressurizing member.

It is another object of the present invention to provide an ultrasonic motor where a sufficient frictional force is produced on the moving body, achieving stable movement, since the engagement strength with the periodically vibrating member is increased by the fitted support member, and a pressurizing force greater than before is applied to the fitted support member.

It is another object of the present invention to provide an ultrasonic motor where stable movement can be achieved against vibration deviation, since the periodically vibrating body is not displaced in any direction other than the regulating direction.

It is a further object of the present invention to provide an ultrasonic motor where the unit configuration on the side of periodically vibrating member can be made compact and simplified, since the pressurizing mechanism on the side of the periodically vibrating member is omitted.

DETAILED DESCRIPTION OF THE PREFERRED EMBODIMENTS

A first invention to solve the above-mentioned technical problems provides an ultrasonic motor having a periodically vibrating member vibrated periodically by the application of a high-frequency voltage and a moving body moved by the periodic vibration of the periodically vibrating member, comprising a node supporting/pressurizing member which supports a vibration node of the periodically vibrating member and presses the periodically vibrating member on the moving body.

The operation of the first invention is such that the node supporting/pressurizing member supports the vibration node of the periodically vibrating member and presses the periodically vibrating member to produce a frictional force between the periodically vibrating member and the moving body, so that a pressurizing member need not be provided in addition to the node supporting/pressurizing member.

In the above-described invention, when the periodically vibrating member consists of a piezoelectric element only, any case where a vibrating body is connected to the piezoelectric element is included.

Also, when the moving body is formed integrally with a driven object, any case where the moving body is formed as a separate member from a driven object is included.

A second invention to solve the above-mentioned technical problems provides an ultrasonic motor having a periodically vibrating member vibrated periodically by the application of a high-frequency voltage and a moving body moved by the periodic vibration of the periodically vibrating member, comprising a fitted support member which is fitted at the vibration node of the periodically vibrating member and increases the engagement strength with the periodically vibrating member.

The operation of the second invention is such that the engagement strength between the fitted support member and the periodically vibrating member is increased, and a large pressing force is applied to the fitted support member, so that a sufficient frictional force is produced between the moving body and the periodically vibrating member.

Also, in the first or second invention, from the viewpoint of stabilizing the moving direction, it is preferable that a guide member for guiding the movement direction be provided on the moving body, whereas a movement regulating member be provided to regulate the movement direction of the moving body together with the guide member.

Also, a third invention to solve the above-mentioned technical problems provides an ultrasonic motor having a periodically vibrating member vibrated periodically by the application of a high-frequency voltage and a friction providing member for moving the periodically vibrating member by providing a frictional force along with the periodic vibration, comprising a guide member for guiding the movement direction of the periodically vibrating member and a movement regulating member for regulating the movement direction of the periodically vibrating member together with the guide member.

The operation of the third invention is such that the periodically vibrating member can be moved precisely in the regulating direction only by the guide member and the movement regulating member.

Also, a fourth invention to solve the above-mentioned technical problems provides an ultrasonic motor having a periodically vibrating member vibrated periodically by the application of a high-frequency voltage, a moving body moved by the periodic vibration of the periodically vibrating member, and a node support member for supporting a vibration node of the periodically vibrating member, comprising a pressuring member for providing a pressing force for pressing the moving body on the periodically vibrating member to the moving body.

The operation of the fourth invention is such that the pressurizing member provides a pressing force from the side of the moving body to press the moving body on the periodically vibrating member, so that a pressurizing member need not be provided on the side of the periodically vibrating member.

Embodiments of the present invention will be described in detail with reference to FIGS. 1 to 12.

EMBODIMENT 1

Figure 1A:
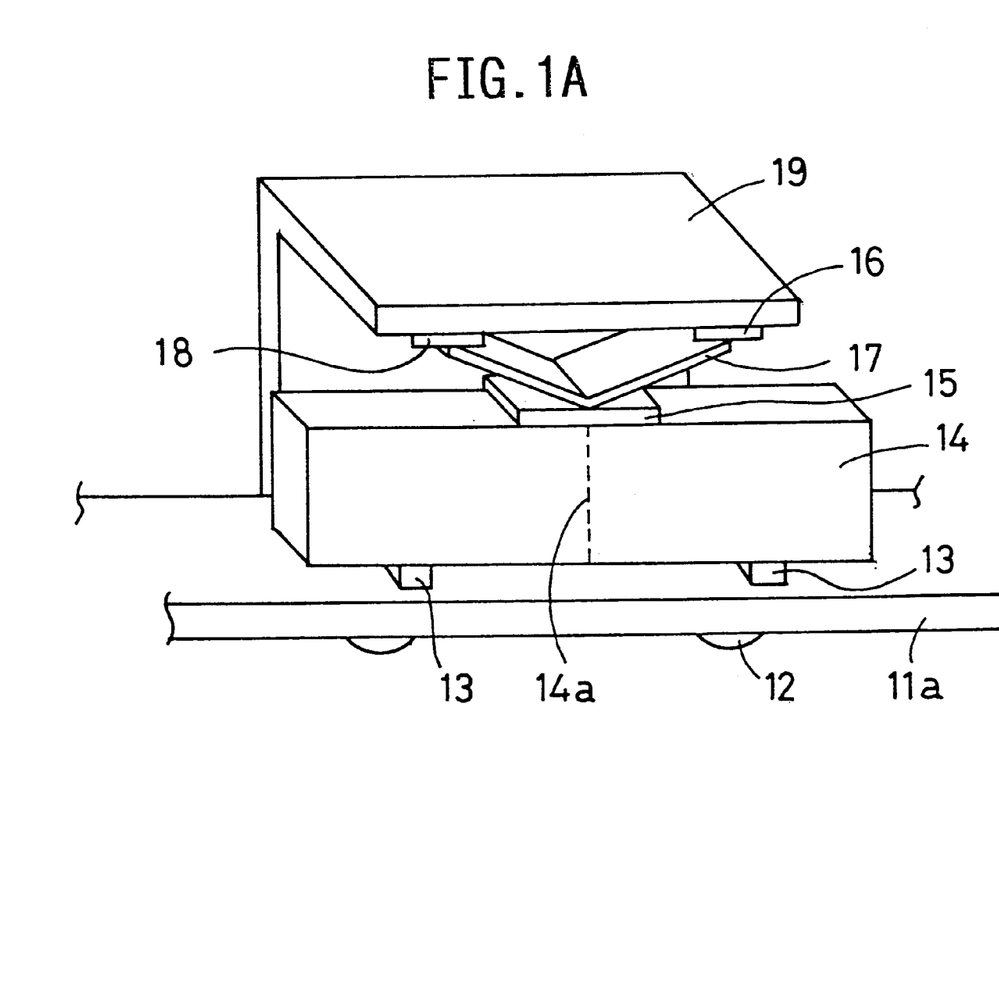
FIGS. 1A and 1B are explanatory views showing embodiment 1 in which a first invention is applied to an ultrasonic drive unit.
Figure 1B:
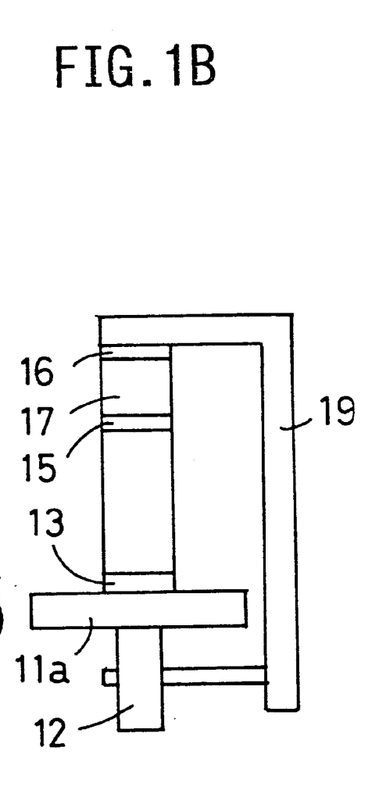

FIGS. 1A and 1B show embodiment 1 in which a first invention is applied to an ultrasonic drive unit.

This embodiment comprises a vibrating body 14 serving as a periodically vibrating member of the present invention, protrusions 13 fixed to the lower part of the vibrating body 14, a rail 11a serving as a moving body of the present invention, which is in contact with the protrusions 13, rotating members 12, which are in contact with the lower surface of the rail 11a, for guiding the rail 11a, a spring member 17 serving as a node supporting/pressurizing member of the present invention, which is in contact with the upper surface of the vibrating body 14, and rubber sheets 15, 16, and 18 disposed between the spring member 17 and the vibrating body 14 and between the spring member 17 and a fixed plate 19.

Further, the vibrating body 14 is formed in a rectangular plate shape, and, for example, made of a piezoelectric element subjected to a predetermined polarization. Also, the vibrating body 14 of a type such that the vibrating portion is in face contact with the piezoelectric element may be used.

The spring member 17 has a V shape in cross section. The lower tip end of V shape is pressed on a vibration node 14a on the vibrating body 14 via the rubber sheet 15, whereas the upper tip ends of V shape are in contact with the fixed plate 19 via the rubber sheets 16 and 18.

Next, the operation of this ultrasonic drive unit will be described.

The vibrating body 14 to which a high-frequency voltage is applied starts elongation vibration and bending vibration. The protrusions 13 fixed to the lower part of the vibrating body 14 come into contact with the rail 11a at a predetermined timing and move the rail 11a linearly in the horizontal direction.

At this time, the spring member 17 supports the vibration node 14a to prevent the vibrating body 14 from moving, and also provides a pressurizing force to the vibrating body 14 due to elastic deformation, so that a sufficient frictional force is produced between the protrusion 13 and the rail 11a. Therefore, it is unnecessary to provide a member for pressurizing the vibrating body 14 in addition to the spring member 17.

As described above, according to this embodiment, the vibrating body 14 is supported and pressurized by one member, so that the pressuring member relating to the prior art is omitted, and the configuration of the unit is simplified and made compact.

Figure 2:
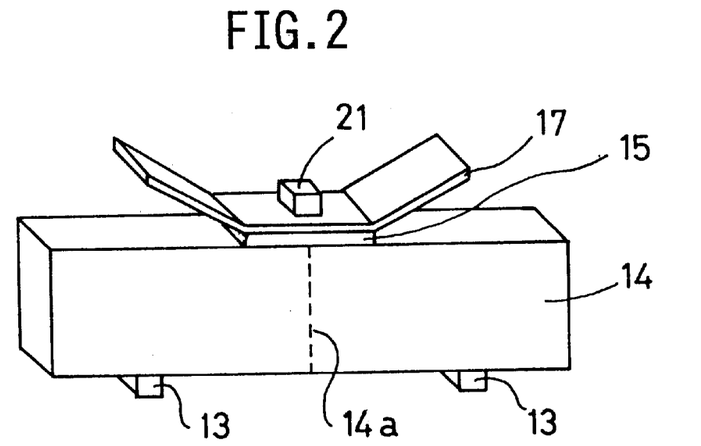
FIG. 2 is an explanatory view showing a modification of the embodiment shown in FIGS. 1A and 1B.

FIG. 2 shows an ultrasonic drive unit in accordance with a modification of embodiment 1.

This modified embodiment has almost the same configuration as that of embodiment 1 except that there is provided a prismatic fastener 21 for fixing the vibrating body 14 bypassing through the rubber sheet 15 and the spring member 17.

According to this configuration, the spring member 17 securely supports the vibration node 14a of the vibrating body 14. Therefore, the support point of the vibrating body 14 is not changed from the vibration node 14a by the vibration of the vibrating body 14, and the vibration of the vibrating body 14 is stabilized.

EMBODIMENT 2

Figure 3:
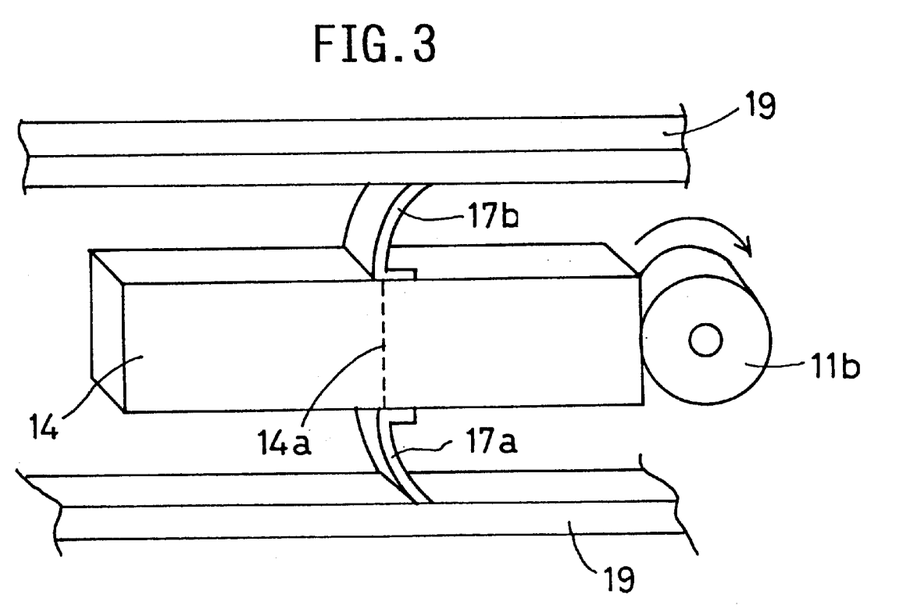
FIG. 3 is an explanatory view showing embodiment 2 in which a first invention is applied to an ultrasonic drive unit.

FIG. 3 shows embodiment 2 in which a first invention is applied to an ultrasonic drive unit.

This embodiment comprises a rectangular vibrating body 14 in contact with a moving body 11b, spring members 17a and 17b fixed at a vibration node 14a of the vibrating body 14, and fixed plates 19 for supporting the spring members 17a and 17b.

Specifically, the spring member 17a, 17b is formed in a convexly curved plate shape, and a portion where the spring member 17a, 17b is fixed to the vibrating body 14 is bent into a shape.

Next, the operation of this embodiment will be described.

The vibrating body 14 to which a high-frequency voltage is applied effects elongation vibration and bending vibration at a predetermined timing, and rotates the moving body 11b by the composite displacement thereof.

At this time, like embodiment 1, the spring member 17a, 17b supports the vibrating body 14, and also provides a pressing force to press the vibrating body 14 on the moving body 11b, so that a member used for pressurization is not needed unlike the prior art.

Figure 4:
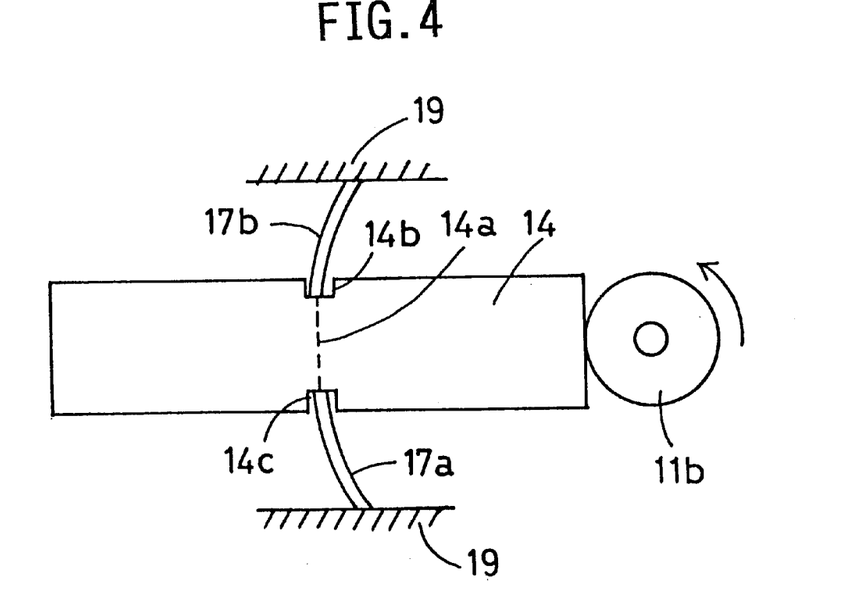
FIG. 4 is an explanatory view showing a modification of the embodiment shown in FIG. 3.
Figure 5:
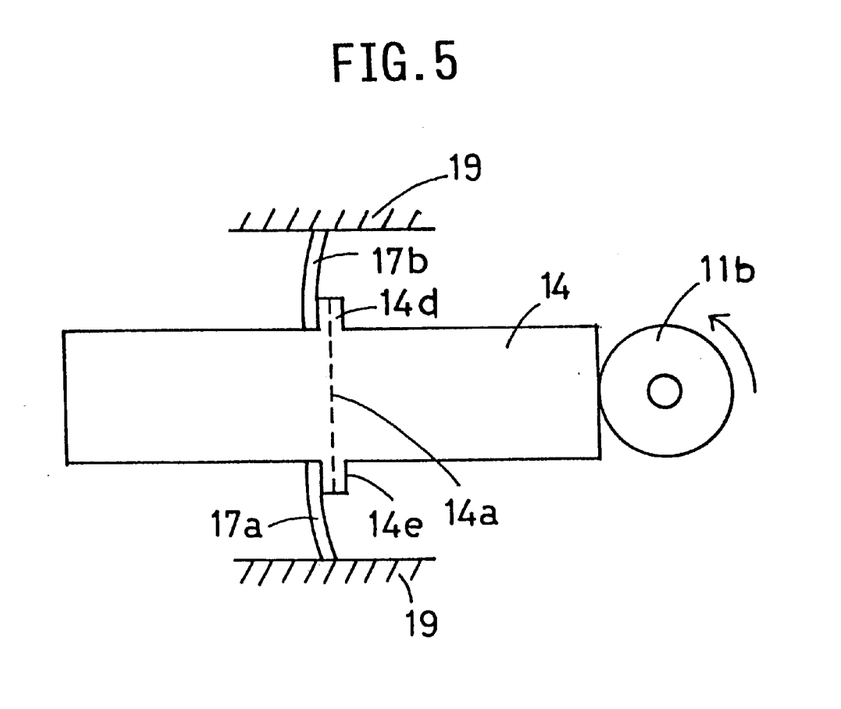
FIG. 5 is an explanatory view showing a modification of the embodiment shown in FIG. 3.

FIGS. 4 and 5 show a modification of embodiment 2.

A first mode of the modified embodiment has almost the same configuration as that of embodiment 2, as shown in FIG. 4, except that engagement grooves 14b and 14c are formed at both edges of the vibration node 14a of the vibrating body 14, and the end portions of the spring members 17b and 17a are engaged with the grooves 14b and 14c, respectively, by deflecting the spring members 17a and 17b.

A second mode of the modified embodiment has almost the same configuration as that of embodiment 2, as shown in FIG. 5, except that engagement protrusions 14d and 14e are provided at both ends of the vibration node 14a of the vibrating body 14, and the spring members 17b and 17a are engaged with the sides of the engagement protrusions 14d and 14e opposite to the moving body 12, respectively, by deflecting the spring members 17a and 17b.

EMBODIMENT 3

Figure 6A:
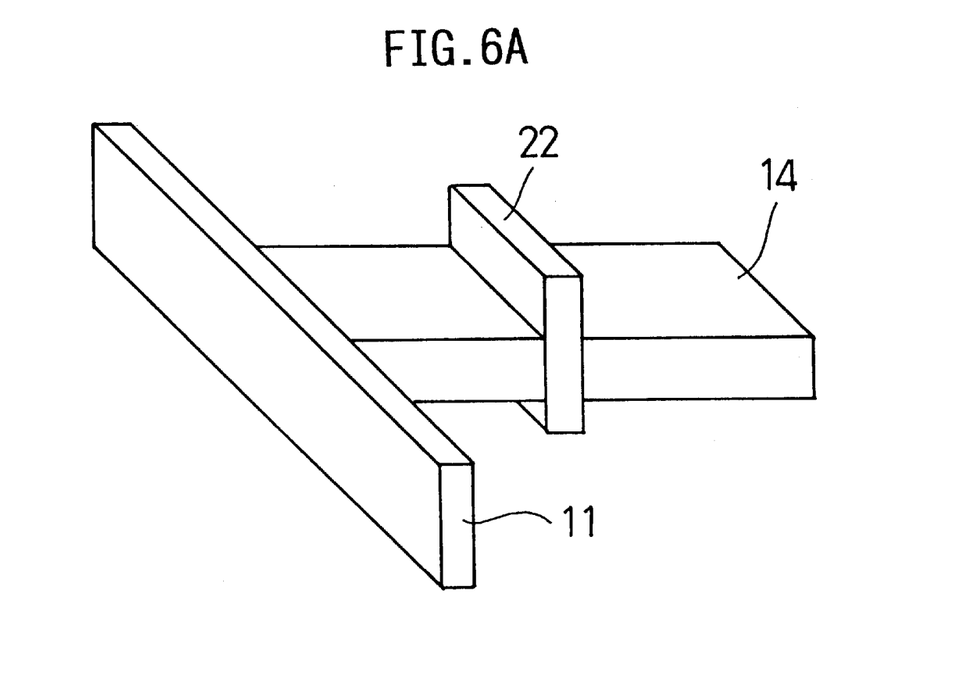
FIGS. 6A and 6B are explanatory views showing embodiment 3 in which a second invention is applied to an ultrasonic drive unit.
Figure 6B:
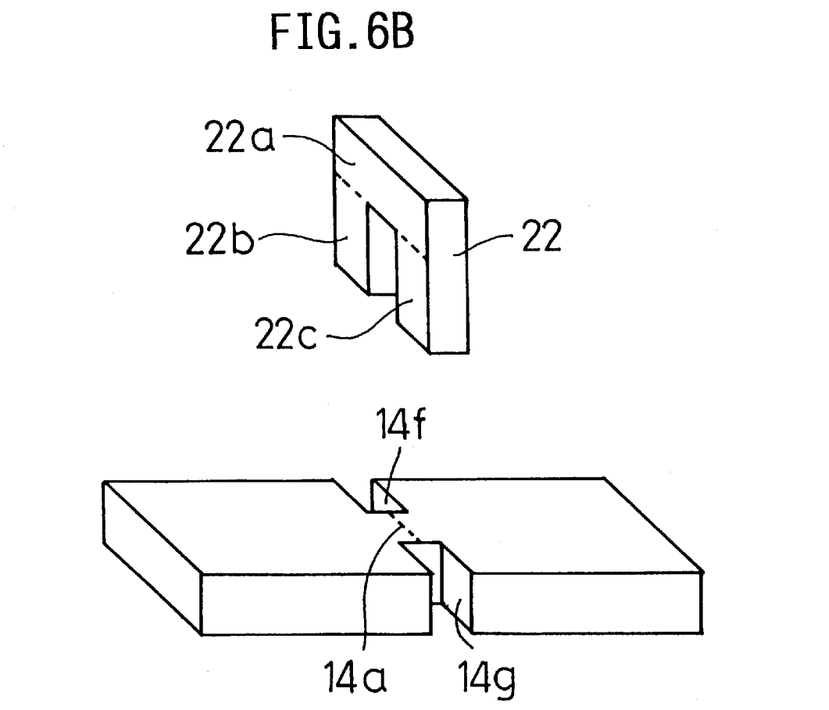

FIGS. 6A and 6B show embodiment 3 in which a second invention is applied to an ultrasonic drive unit.

As shown in FIG. 6A, this embodiment comprises a vibrating body 14 in contact with a moving body 11 and a fitted support member 22 serving as a fitted support member of the present invention, which is fitted to a vibration node 14a of the vibrating body 14.

Further, as shown in FIG. 6B, the vibrating body 14, which is rectangular, has recesses 14f and 14g, which are formed by cutting out the vibrating body 14 at the vibration node 14a from the edge toward the center into a rectangular parallelepipedic shape.

Also, the fitted support member 22 is made up of a body 22a formed in a rectangular parallelepipedic shape and prismatic protruding portions 22b and 22c protruding from both edges of the body 22a.

According to this configuration, the protruding portions 22b and 22c of the vibrating body 14 are fitted into the recesses 14f and 14g of the fitted support member 22 to increase the support strength, so that a large force is applied to the fitted support member 22. Therefore, a sufficient frictional force is produced between the vibrating body 14 and the moving body 11.

Figure 7A:
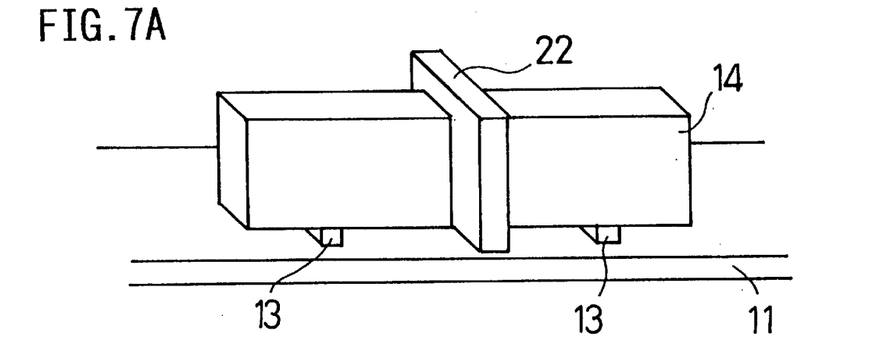
FIGS. 7A and 7B are explanatory views showing a modification of the embodiment shown in FIGS. 6A AND 6B.
Figure 7B:
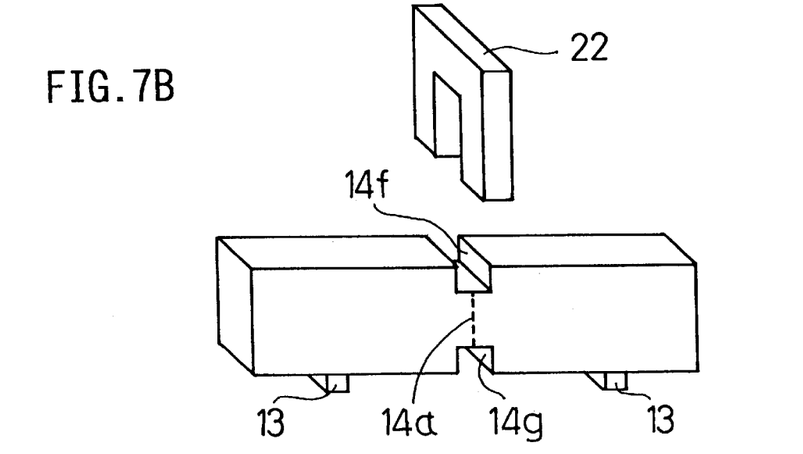

FIGS. 7A and 7B show a modified embodiment in which the second invention is applied to a horizontal type vibrating body 14.

This modified embodiment is characterized in that a U-shaped fitted support member 22 is fitted into a recess 14f at one end of a vibration node 14a of the vibrating body 14.

This configuration also achieves a similar effect.

EMBODIMENT 4

Figure 8:
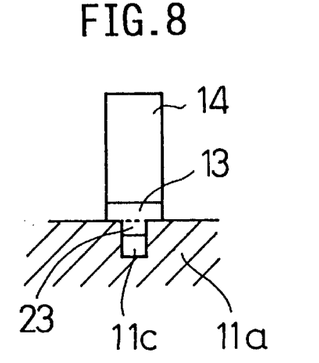
FIG. 8 is an explanatory view showing embodiment 4 in which the ultrasonic drive unit shown in FIGS. 1A and 1B are improved.

FIG. 8 shows embodiment 4 in which the moving direction of the moving body in accordance with the first invention is improved.

This embodiment comprises a vibrating body 14, protrusions 13 provided on the lower side of the vibrating body, a rail 11a in contact with the protrusions 13, a guide groove 11c serving as a guide member of the present invention, which is formed on the surface of the rail 11a, and movement regulating members 23 serving as movement regulating members of the present invention, which are provided integrally with the protrusions 13.

According to this configuration, the movement regulating members 23 enter the guide groove 11c to regulate the moving direction of the rail 11a. Therefore, the rail 11a is not affected by vibration deviation of the vibrating body 14, so that stable movement is effected.

Figure 9:
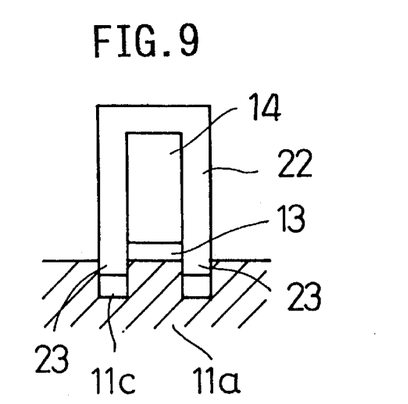
FIG. 9 is an explanatory view showing a modification of the embodiment shown in FIG. 8.

FIG. 9 shows a modification of embodiment 4.

This modified embodiment has almost the same configuration as that of embodiment 4 except that a fitted support member 22 is fitted at the vibration node of a vibrating body 14, and both ends of the fitted support member 22 are used as movement regulating members 23.

This configuration also achieves a similar effect to that of embodiment 4.

EMBODIMENT 5

Figure 10A:
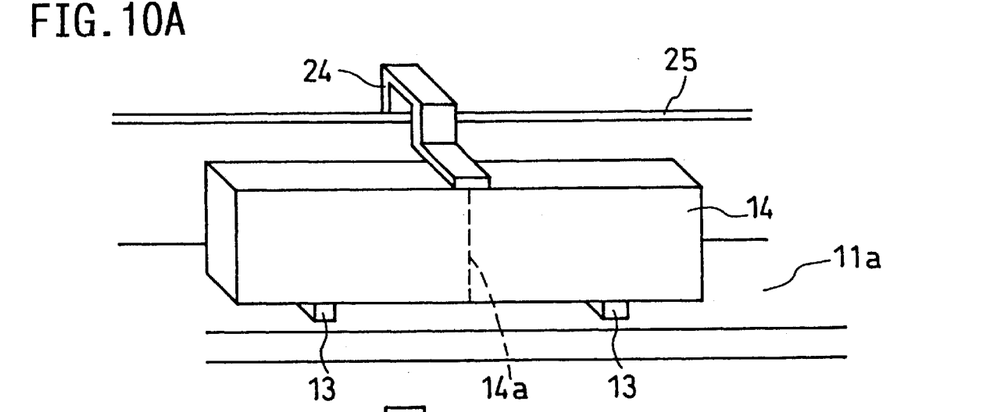
FIGS. 10A and 10B are explanatory views showing embodiment 5 in which a third invention is applied to an ultrasonic drive unit.
Figure 10B:
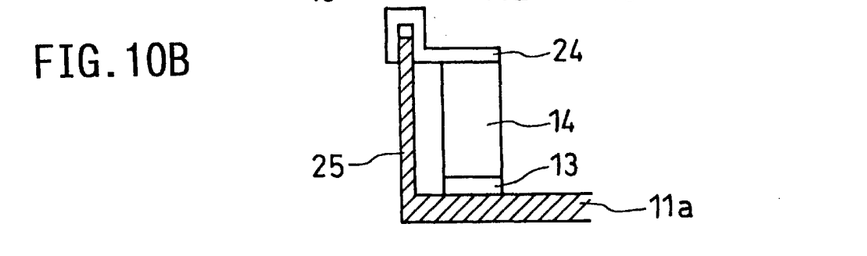

FIGS. 10A and 10B shows embodiment 5 in which a third invention is applied to an ultrasonic drive unit.

As shown in FIGS. 10A and 10B, this embodiment comprises a vibrating body 14, protrusions 13 provided on the lower side of the vibrating body 14, a rail 11a serving as a friction providing member of the present invention, which is in contact with the protrusions 13, a movement regulating member 25 serving as a moving regulating member of the present invention, which is fixed to the rail 11a, and a guide member 24 serving as a guide member of the present invention, which is fixed at a vibration node 14a of the vibrating body 14.

Further, the movement regulating member 25, being formed in a plate shape, is fixed vertically with respect to the rail 11a. Also, the guide member 24, consisting of a plate-shaped vibrating body attaching portion and a portion having a U shape in cross section, is constructed so that the movement regulating member 25 is inserted into the U-shaped portion. The vibrating body 14 is subjected to a pressurizing force which presses the vibrating body 14 on the rail 11a.

Next, the operation of this ultrasonic drive unit will be described.

When periodic vibrations of the vibrating body 14 are transmitted to the protrusions 13, a frictional force is produced between the protrusion 13 and the rail 11a, so that the vibrating body 14 moves horizontally on the rail 11a.

At this time, even if a vibration deviation occurs on the vibrating body 14, the vibrating body 14 is guided in the direction such that it is regulated by the guide member 24 and the movement regulating member 25.

Thus, according to this embodiment, since the vibrating body 14 is not displaced in any direction other than the predetermined regulating direction, the vibrating body 14 moves stably in the regulating direction.

EMBODIMENT 6

Figure 11A:
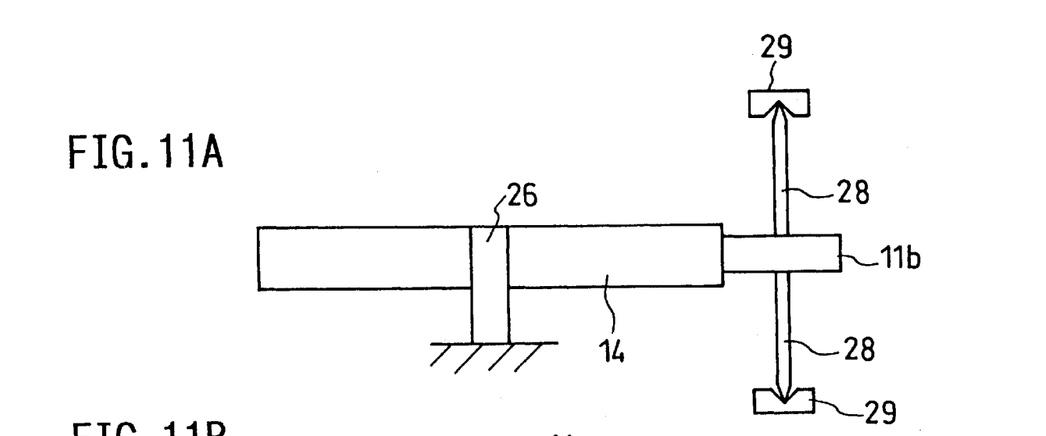
FIGS. 11A and 11B are explanatory views showing embodiment 6 in which a fourth invention is applied to an ultrasonic drive unit.
Figure 11B:
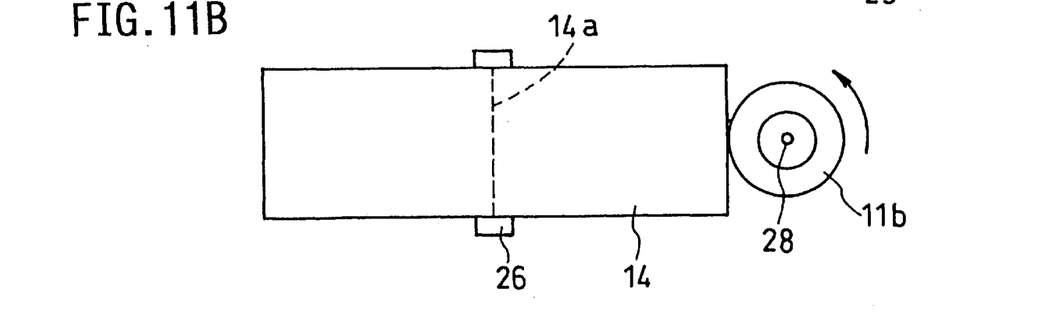

FIGS. 11A and 11B shows embodiment 6 in which a fourth invention is applied to an ultrasonic drive unit.

This embodiment comprises a vibrating body 14 serving as a periodically vibrating member of the present invention, which vibrates periodically, support members 26 serving as node support members of the present invention, which support the vibrating body 14 at a vibration node 14a, a rotating body 11b serving as a moving body of the present invention, which is in contact with the vibrating body 14, a pressurizing force transmitting shaft 28 serving as a pressurizing member, which passes through the rotation center of the rotating body 11b, and a pair of bearings 29 supporting the tip ends of the pressurizing force transmitting shaft 28.

Figures 12A, 12B:
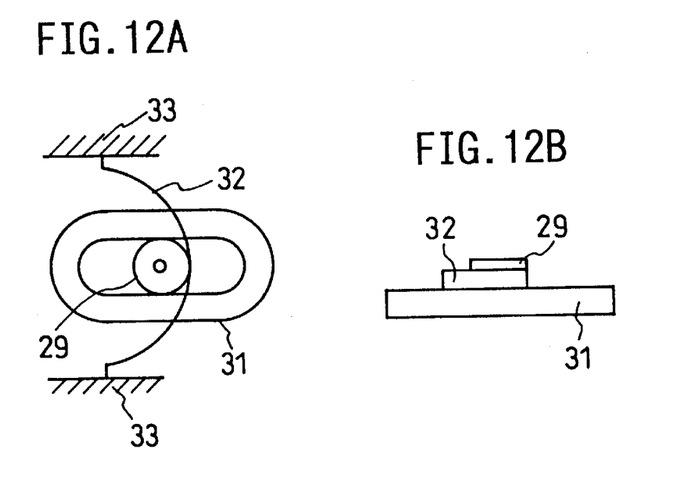
FIGS. 12A and 12B are explanatory views showing a pressurizing mechanism relating to FIGS. 11A and 11B.

Further, as shown in FIGS. 12A and 12B, a pressurizing mechanism of this embodiment is made up of a guide ring 31 for guiding the moving direction of the bearing 29 and a spring member 32 for applying a pressure to the bearing 29. The aforesaid pressurizing force transmitting shaft 28, bearings 29, guide rings 31, and spring members 32 correspond to the pressurizing member of the present invention.

The pressurizing force transmitting shaft 28, being formed in a long rod shape, is sharpened at both ends. The bearing 29 has a disk shape, and the support portion thereof for supporting the tip end of the pressurizing force transmitting shaft 28 has a concave shape. Also, the guide ring 31, being formed in a transversely elongated circular shape, has a guide portion having the same shape at the central portion. Further, the spring member 32 has a shape deflected into a U shape, and both ends thereof are fixed to a fixed member 33.

Next, the operation of this ultrasonic drive unit will be described.

The vibrating body 14 is vibrated by a periodic combination of elongation vibration and bending vibration.

At this time, a pressurizing force is applied to the bearings 29 by elastic deformation of the spring members 32, the bearings 29 are guided in the direction of the vibrating body 14 by the guide rings 31, and the pressurizing force transmitting shaft 28 locked by the bearings 29 provides a pressurizing force, which presses the rotating body 11b on the vibrating body 14, to the rotating body 11b.

In this state, a sufficient frictional force is produced between the vibrating body 14 and the rotating body 11a, so that the rotating body 11b is rotated stably in a predetermined direction. Therefore, a pressurizing mechanism need not be provided on the side of the vibrating body 14.

According to this configuration, since a pressurizing force is applied from the side of the rotating body 11b, the unit configuration on the side of the vibration body is simplified and made compact.

EMBODIMENT 7

This embodiment is characterized in that a predetermined groove is provided in the direction of vibration mode displacement on a rectangular plate shaped vibrating body of dual vibration mode.

According to this configuration, when the resonance frequencies of elongation vibration and bending vibration do not agree with each other, the resonance frequencies are made to agree by the predetermined groove. Therefore, the vibrating body need not be fabricated with tight accuracy to make the resonance frequencies agree with each other, so that the manufacturing process of the vibrating body can be simplified.

EMBODIMENT 8

Figure 15:
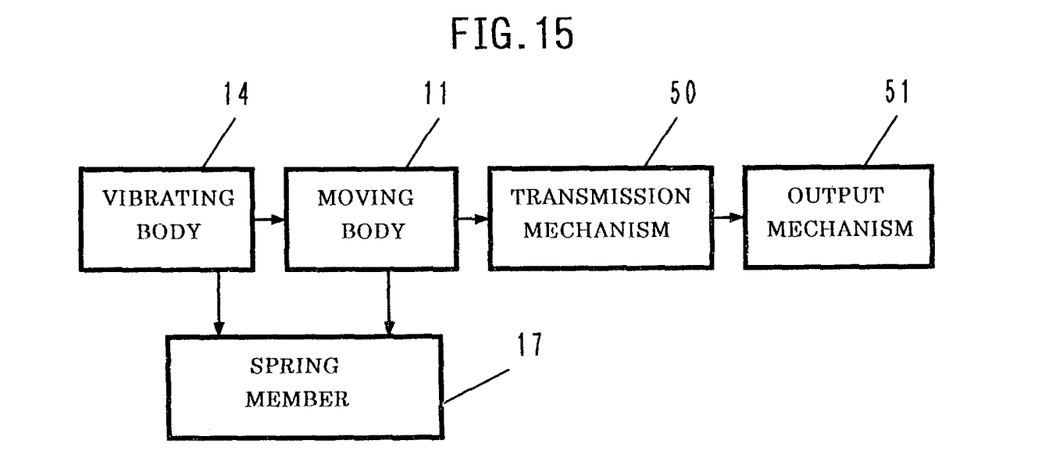
FIG. 15 is a block diagram showing an embodiment of an electronic apparatus with the ultrasonic motor in accordance with the present invention.

FIG. 15 is a block diagram for an embodiment of an electronic apparatus with the ultrasonic motor in accordance with the present invention. By using the ultrasonic motor shown in the above embodiments, an electronic apparatus with an ultrasonic motor can be realized by providing a transmission mechanism 50 operating integrally with a moving body 11 of the ultrasonic motor and an output mechanism 51 operating based on the operation of the transmission mechanism 50. As the transmission mechanism 50, a transmission wheel such as gear and frictional wheel and the like are preferably used. As the output mechanism 51, preferably, a shutter driving mechanism and lens driving mechanism are used for a camera, a hand driving mechanism, calendar driving mechanism, etc. for an electronic clock, and a tool feed mechanism, workpiece feed mechanism, etc. for a machine tool.

As the electronic apparatus with the ultrasonic motor in accordance with the present invention, electronic clocks, measuring instruments, cameras, printers, printing machines, machine tools, robots, transfer apparatuses, and the like are preferably realized. Further, if a configuration is employed in which an output shaft is installed to the moving body, and a power transmission mechanism is provided to transmit a torque from the output shaft, a driving mechanism for an ultrasonic motor can be realized.

What is claimed is:

1. An ultrasonic motor comprising: a vibrating member vibrationally driven for undergoing periodic vibration by the application of a high-frequency voltage; a moving body frictionally driven by the periodic vibration of the vibrating member; and at least one spring member for supporting a vibration node of the vibrating member and for pressing the vibrating member on the moving body.

2. An ultrasonic motor comprising: a vibrating member vibrationally driven for undergoing periodic vibration by the application of a high-frequency voltage, the vibrating member having a pair of recesses disposed on opposite sides of a vibration node of the vibrating member; a moving body connected to the vibrating member to be frictionally driven by the periodic vibration of the vibrating member; and a support member fitted at a vibration node of the vibrating member for increasing a frictional force generated between the moving body and the vibrating member, the support member having a pair of protruding portions each disposed in one of the recesses of the vibrating member.

3. An ultrasonic motor as claimed in claim 2; wherein the moving body has a guide member for guiding movement of the moving body in a moving direction; and further comprising a movement regulating member for cooperative engagement with the guide member to regulate the moving direction of the moving body.

4. An ultrasonic motor comprising: a vibrating member vibrationally driven for undergoing periodic vibration by the application of a high-frequency voltage; a rotational body frictionally driven by the periodic vibration of the vibrating member to undergo rotation; a node support member for supporting the vibration member at a vibration node of the vibrating member; and a pressurizing member for applying a pressing force to the rotational body at a center of rotation thereof to press the rotational body on the vibrating member, the pressurizing member comprising a shaft supported by a pair of movable bearings at end portions thereof for undergoing rotation.

5. In an electronic apparatus having an output mechanism for producing an output motion, an ultrasonic motor as claimed in claim 1 for driving the output mechanism, and a transmission member integrally connected to the moving body of the ultrasonic motor for transmitting movement of the moving body to the output mechanism to drive the output mechanism to produce the output motion.

6. An ultrasonic motor according to claim 1; wherein the spring member is generally V-shaped.

7. An ultrasonic motor according to claim 1; wherein the at least one spring member comprises a pair of spring members.

8. An ultrasonic motor as claimed in claim 1; wherein the moving body has a guide member for guiding movement of the moving body in a moving direction; and further comprising a movement regulating member for cooperative engagement with the guide member to regulate the moving direction of the moving body.

9. An ultrasonic motor comprising a vibrating member vibrationally driven for undergoing periodic vibration by the application of a high-freguency voltage; a moving body frictionally driven by the periodic vibration of the vibrating member, the moving body having a guide member for guiding movement of the moving body in a moving directions; a node supporting/pressurizing member for supporting the vibrating member at a vibration node thereof and pressing the vibrating member on the moving body; and a movement regulating member for cooperative engagement with the guide member to regulate the moving direction of the moving body, the movement regulating member being integrally connected to the vibrating member.

10. An ultrasonic motor according to claim 2; wherein the support member is generally U-shaped.

11. In an electronic apparatus having an output mechanism for producing an output motion, an ultrasonic motor as claimed in claim 2 for driving the output mechanism, and a transmission member integrally connected to the moving body of the ultrasonic motor for transmitting movement of the moving body to the output mechanism to drive the output mechanism to produce the output motion.

12. An ultrasonic motor comprising: a vibrating member vibrationally driven for undergoing periodic vibration by the application of a high-frequency voltage; a moving body connected to the vibrating member to be frictionally driven by the periodic vibration of the vibrating member, the moving body having a guide member for guiding movement of the moving body in a moving direction; a movement regulating member integrally connected to the vibrating member for cooperative engagement with the guide member of the moving body to regulate the moving direction of the moving body; and a support member fitted at a vibration node of the vibrating member for increasing a frictional force generated between the moving body and the vibrating member.

13. In an electronic apparatus having an output mechanism for producing an output motion, an ultrasonic motor as claimed in claim 3 for driving the output mechanism, and a transmission member integrally connected to the moving body of the ultrasonic motor for transmitting movement of the moving body to the output mechanism to drive the output mechanism to produce the output motion.

14. An ultrasonic motor comprising: a vibrating member vibrationally driven for undergoing periodic vibration by the application of a high-frequency voltage; a friction member connected to the vibrating member for generating a frictional force between the vibrating member and the friction member to move the vibrating member when the vibrating member undergoes periodic vibration; a guide member for guiding movement of the vibrating member in a moving direction; and a movement regulating member directly connected to the friction member for cooperative engagement with the guide member to regulate the moving direction of the vibrating member.

15. An ultrasonic motor comprising: a vibrating member vibrationally driven for undergoing periodic vibration by the application of a high-freguency voltage; a friction member connected to the vibrating member for generating a frictional force between the vibrating member and the friction member to move the vibrating member when the vibrating member undergoes periodic vibration; a guide member for guiding movement of the vibrating member in a moving direction and connected to the vibrating member at a vibration node thereof and a movement regulating member for cooperative engagement with the guide member to regulate the moving direction of the vibrating member.

16. An ultrasonic motor comprising: a vibrating member vibrationally driven for undergoing periodic vibration by the application of a high-frequency voltage; a friction member connected to the vibrating member for generating a frictional force between the vibrating member and the friction member to move the vibrating member when the vibrating member undergoes periodic vibration: a guide member directly connected to the friction member for guiding movement of the vibrating member in a moving direction; and a movement regulating member for cooperative engagement with the guide member to regulate the moving direction of the vibrating member.

17. In an electronic apparatus having an output mechanism for producing an output motion, an ultrasonic motor as claimed in claim 4 for driving the output mechanism, and a transmission member integrally connected to the rotational body of the ultrasonic motor for transmitting movement of the rotational body to the output mechanism to drive the output mechanism to produce the output motion.

18. An ultrasonic motor comprising: a vibrating member; vibrating means for vibrationally driving the vibrating member to undergo periodic vibration; a moving body frictionally driven by the periodic vibration of the vibrating member; and supporting/pressurizing means for supporting a vibration node of the vibrating member and pressing the vibrating member on the moving body.

19. An ultrasonic motor according to claim 18; wherein the supporting/pressurizing means comprises a spring member.

20. An ultrasonic motor according to claim 19; wherein the spring member is generally V-shaped.

21. An ultrasonic motor according to claim 18; wherein the supporting/pressurizing means comprises a pair of spring members.

22. An ultrasonic motor according to claim 21; wherein each of the spring members is fixed to the vibrating member at the vibration node thereof.

23. In an electronic apparatus having an output mechanism for producing an output motion, an ultrasonic motor as claimed in claim 18 for driving the output mechanism, and a transmission member integrally connected to the moving body of the ultrasonic motor for transmitting movement of the moving body to the output mechanism to drive the output mechanism to produce the output motion.

* * * * *